March 25, 1941.  H. W. RUBINSTEIN ET AL  2,236,072
ELECTRICAL CONTROL DEVICE
Filed Oct. 15, 1938    4 Sheets-Sheet 2

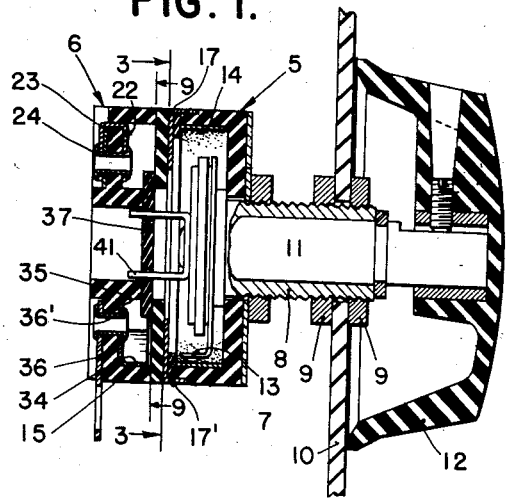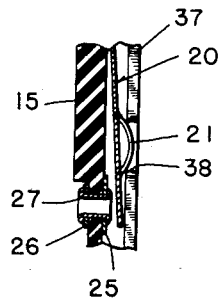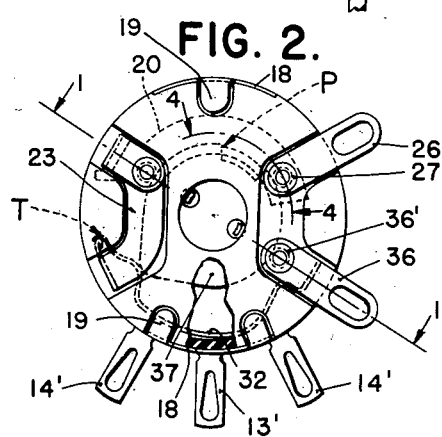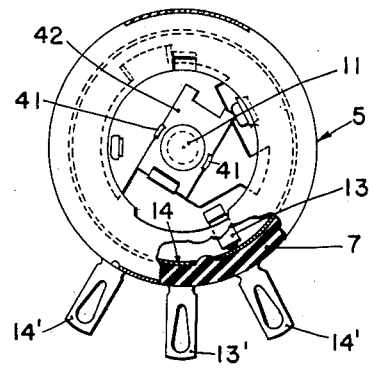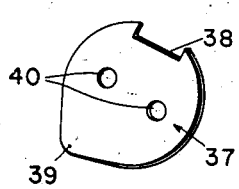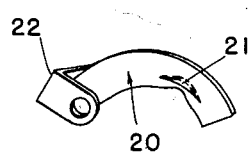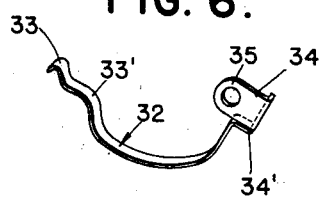

INVENTORS
HARRY W. RUBINSTEIN
AND HERBERT L. ZIMMERMAN
BY John W. Michael
ATTORNEY March 25, 1941.  H. W. RUBINSTEIN ET AL  2,236,072
ELECTRICAL CONTROL DEVICE
Filed Oct. 15, 1938   4 Sheets-Sheet 3
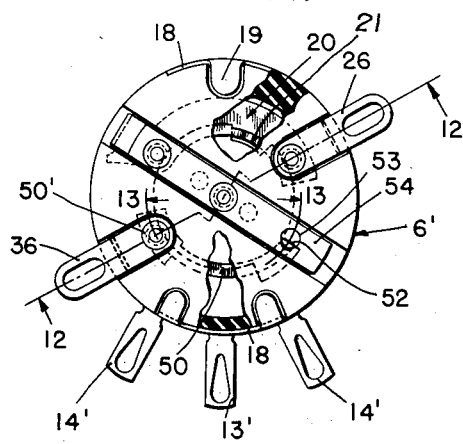
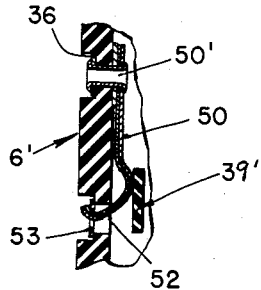
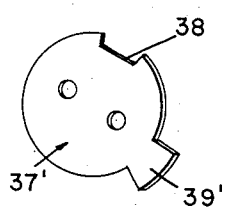
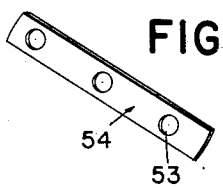
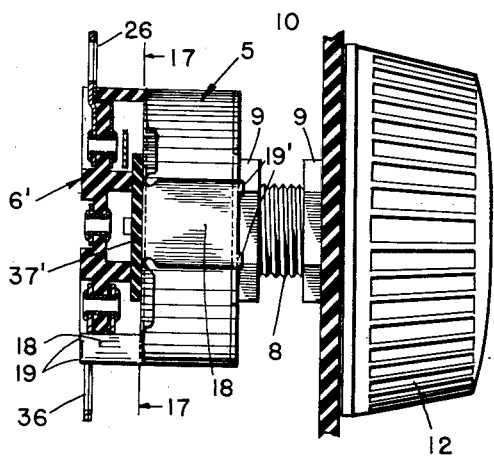
INVENTORS
HARRY W. RUBINSTEIN
AND HERBERT L. ZIMMERMAN
BY John W. Michael
ATTORNEY March 25, 1941.   H. W. RUBINSTEIN ET AL   2,236,072
ELECTRICAL CONTROL DEVICE
Filed Oct. 15, 1938   4 Sheets-Sheet 4

INVENTORS
HARRY W. RUBINSTEIN
AND HERBERT L. ZIMMERMAN

BY John W. Michael

ATTORNEY

Patented Mar. 25, 1941

2,236,072

UNITED STATES PATENT OFFICE 2,236,072

ELECTRICAL CONTROL DEVICE

Harry W. Rubinstein and Herbert L. Zimmerman, Milwaukee, Wis., assignors to Globe-Union Inc., Milwaukee, Wis., a corporation of Delaware Application October 15, 1938, Serial No. 235,217

7 Claims. (Cl. 200—116)

This invention relates to an improvement in electrical control devices especially designed and adapted for use in connection with radio receivers although also adapted for other uses and applications.

In its application to a radio receiver the invention lends itself to embodiment in a combined volume control, power or line switch and overload circuit breaker. When so constituted, surges of current through the overload circuit will cause it to open automatically to protect the receiver and yet it may be readily reset by manipulation of the volume control. This avoids the replacement of a fuse and if the fault is transitory in character, the receiver will continue to operate upon turning up of the volume controls. However, the arrangement is such that whenever the overload circuit breaker is manually reset or closed and held closed then the line or power switch is open.

Another object of the invention is to provide an extremely simple, compact and closely organized structure which may be encompassed within very small dimensions and consequently is well adapted for use in connection with radio receivers employed on automobiles.

In one embodiment of the invention the overload circuit breaker and power line switch are both accommodated in a small housing of insulating material which is fastened directly to the insulating housing of the volume control device.

The power or line switch has a movable contact in the form of an arcuate spring biased by its inherent resiliency to open position but closed by means of a disk of insulating material which is constrained to rotate with the operating shaft of the volume control device and has one face bearing against a projection on the movable spring contact. At one point in the periphery of the disk a notch is provided into which the projection on the spring contact is received in the angular adjustment of the disk which corresponds to the angular position which the operating shaft and knob of the volume control device assume when the volume control device approaches the low volume position.

The overload circuit breaker has a fixed contact in the form of a keeper and a movable contact provided with a hooked end constituting a latch which in the closed position of the circuit breaker is interengaged with the keeper. The movable contact of the circuit breaker is a bimetallic element which under normal loads will remain in engagement with the keeper. When excessive current passes through the movable contact of the circuit breaker it becomes heated and will flex inwardly to disengage its latching hooks from the keeper and thereby open the circuit. The same disk that controls the position of the power switch has a cam projection on its periphery which is cooperable with a portion of the bimetallic element to reset or close the circuit breaker when the operating shaft is turned back to its initial position. Just prior to the closing or resetting of the circuit breaker the notch of the disk allows the power switch to open.

Another object of the invention is to provide a device of this character wherein the action of the parts is characterized by a click and a distinct feel which indicates to the operator when the volume control device is in its low or off position.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view in longitudinal transverse cross section taken on line 1—1 of Figure 2, parts being shown in elevation for the sake of simplicity and illustration;

Figure 2 is a view in elevation looking toward the left hand end of Figure 1, parts being broken away and shown in section for the sake of illustration;

Figure 3 is a view in transverse cross section taken on line 3—3 of Figure 1;

Figure 4 is a fragmentary sectional view taken on line 4—4 of Figure 2;

Figures 5, 6, 7 and 8 are detail perspective views of the movable contact of the power switch, the thermo-responsive element of the thermal switch, its cooperable keeper, and the operating disk for controlling the power switch and resetting the thermal switch respectively;

Figure 11 is a view in elevation similar to Figure 2 but showing a modified form of construction;

Figure 12 is a view in transverse cross section taken on line 12—12 of Figure 11;

Figure 13 is a view in section taken on line 13—13 of Figure 11 and showing the construction of the thermal switch;

Figure 14 is a detail perspective view of the thermo element of the thermal switch;

Figure 15 is a similar view of the disk for controlling the line switch and resetting the thermal switch;

Figure 16 is a similar view of the connecting strip mounted between the terminals of the thermal and power switches to connect them in series;

Figure 9:
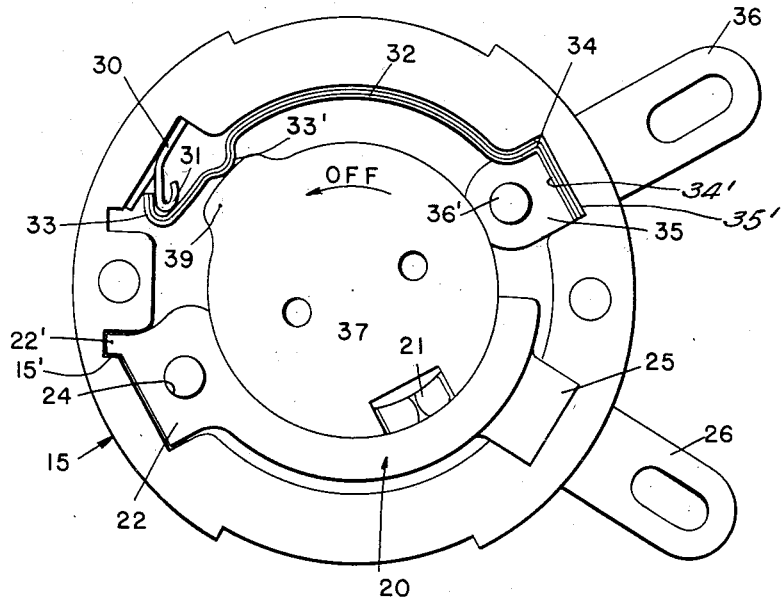
Figure 9 is a view in section taken on line 9—9 of Figure 1.

Referring to the drawings, and more particularly to Figure 1, it will be seen that the control device embodying the present invention comprises generally an adjustable resistance or volume control designated at 5 and a combined line and an overload circuit breaker or thermal switch designated generally at 6.

The volume control device 5 includes a housing 7 of insulating material having a bushing 8 extending axially therefrom and fastened by means of nuts 9 to a panel 10. The operating shaft for the adjustable resistance or volume control is designated at 11 and is rotatably fitted in the bushing 8 and turned by means of the usual knob 12. The adjustable contact of the resistance 5 is indicated generally at 13 and travels around the resistance element 14 which is supported and held against the inner peripheral wall of the housing 7. Terminals 13' and 14' are provided to connect the movable contact 13 and resistance element in a circuit in the usual way. The details of the adjustable resistance of this type are well known and widely used and as they form no part (per se) of the present invention, they will not be further described.

The switch unit 6 also includes a housing 15 of insulating material which is fastened against the rear face of the housing 7 of the adjustable resistance by means of a metallic connecting element including an annular body portion 17 and oppositely extending arcuate flanges 18 terminating in tabs 19 and 19' bent about the ends of the insulated housing 7 and 15 respectively. An insulating washer 17' is interposed between the annular body portion 17 and the resistance element 14 of the volume control.

Mounted in the housing 15 is a line or power switch designated generally at P and a thermal switch designated generally at T.

The line switch P comprises a movable or resilient contact designated generally at 20 and in the form of an arcuate strip of spring metal having a portion displaced outwardly from the plane of the strip to provide a boss or projection 21. The strip may have integral therewith an angular terminal 22, a portion of which extends through a slot in the housing and another portion of which is disposed on the outer face of the housing and secured in position and also electrically connected with a connecting strip 23 by means of an eyelet 24. The end of the movable contact strip 20 which has the angular terminal 22 integral therewith also has an integral positioning lug 22' which fits in a notch 15' formed in the housing 15 to bring about such positioning of the movable contact strip 20 that its free end overlies a fixed contact 25 fastened in position in the housing and electrically connected to a terminal 26 by means of an eyelet 27. The movable contact strip 20 is resilient and is so formed and tensioned as to be biased to spring away from the fixed contact by virtue of its inherent resiliency and shape. When the switch is closed, this movable contact switch is pressed into good electrical contact with the fixed contact 25.

The connecting strip 23 has one end bent at right angles to the plane of the strip, as indicated at 30, and extended through a slot in the housing. One edge of the angularly extended portion 30 is curled upon itself to provide the keeper 31 of the thermal switch T. The overload circuit breaker or thermal switch T also includes a thermo-responsive or bimetallic element designated at 32, and is also in the form of a curved metal strip having a hook formation 33 at its free end designed to interengage with or be latched to the keeper 31 in the closed position of the thermal switch. The end of the strip 32 opposite its hook formation 33 has integral therewith a positioning and attaching formation designated generally at 34 and made up of an L-shaped offset 34' having an attaching tab 35 integral with the one edge of the outer leg of the L-shaped offset 34'. The offset 34' interfits with a notch 35' formed in the housing to locate the bimetalic element 32 in proper position, and the tab 35 is fastened in position and electrically connected to a terminal 36 by an eyelet 36'.

The operating element which controls the opening and closing of the line switch P and also is effective to reset or close the thermal switch T is preferably in the form of a disk of insulating material designated at 37 disposed in the housing 15 with one face in contact with the projection 21 of the movable contact 20 of the power or line switch to maintain this switch closed. A notch 38 is provided in the periphery of the disk 37 and when this notch overlies the projection 21 it allows the movable contact of the switch to spring to open position under the influence of its inherent resiliency.

The disk 37 is also provided with a nose or cam 39 which is designed to close or reset the overload circuit breaker or thermal switch when the volume control is turned down to its low or off position. In effecting resetting of the thermal switch the nose or cam 39 engages an inwardly bowed portion 33' of the bimetallic element 32, as shown in Figure 9.

The disk 37 is rotated from the knob 12 and for this purpose the disk 37 is provided with diametrically alined openings or holes 40 interfitted over lugs 41 provided on a U-shaped operating or motion transmitting element 42 which is secured in any suitable way to the inner end of the shaft 11 or to the movable contact of the volume control.

Figure 10:
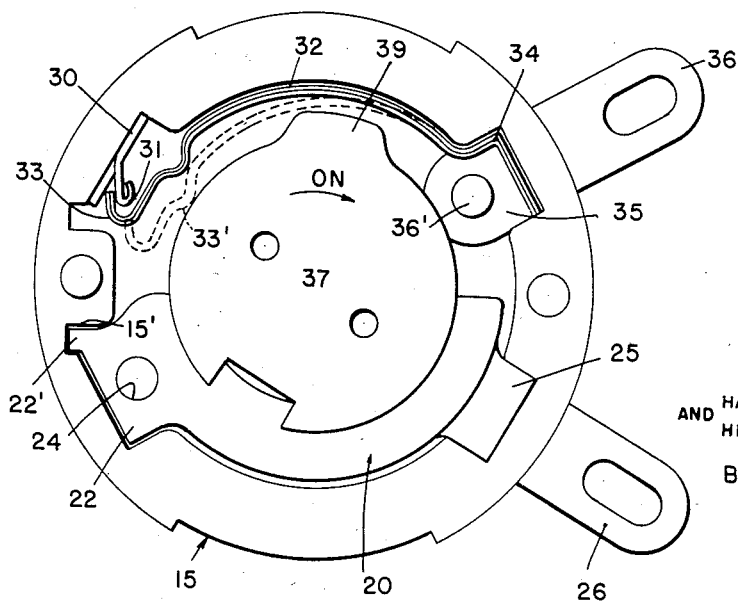
Figure 10 is a view similar to Figure 9 but showing a different position of the operating disk.

The driving connection for the operating disk 37 afforded by the lugs 41 and openings or holes 40 is such as to allow for a certain amount of lost motion so that when the notch 38 of the disk 37 rides over the projection 21 on the movable spring contact 20 the tension of the spring contact will be effective to shift the disk circumferentially with a quick motion thereby causing the switch to open with a faster action approaching a snap action. The openings 40 are slightly larger than the lugs 41 to effect this operation. The parts are also so designed and proportioned that the line switch P opens prior to the engagement of the nose or cam 39 of the disk with the inwardly bowed portion 33' of the bimetallic element 32 of the thermal switch or overload circuit breaker T. The position which the parts assume when the line switch is open and the thermal switch or overload circuit reset is shown in Figure 9. In Figure 10 the parts are shown in full lines with both the line switch and the thermal switch or overload circuit breaker closed. The dotted line of Figure 10 shows how the bimetallic element 32 flexes inwardly to break the circuit when a surge of current passes therethrough.

In the construction just shown and described the power or line switch and the thermal switch or overload circuit breaker are connected in series but of course, they may be electrically interrelated in any desired fashion.

The construction shown in Figures 11 to 18 inclusive is generally the same as that hereinabove described in that as before, it includes a volume control device designated at 5 and identical with the one previously described, and a combined line or power switch and overload circuit breaker or thermal switch designated generally at 6'. The line switch is also identical with the line switch P and as before, comprises a movable strip contact 20 biased to open position and cooperable in its closed position with a fixed contact 25. The movable strip contact 20 in this embodiment also has a projection 21 cooperable with a notch 38 of an operating disk 37' similar to the operating disk 37 except that it has a different type of cam or projection, designated at 39', and corresponding in function to the cam or nose 39 of the other embodiment. In this structure however, the overload circuit breaker or power switch takes a slightly different form. It includes a movable contact in the form of a bimetallic strip 50 which is curved, but instead of lying against the inner peripheral wall of the insulating housing of the unit 6', lies against the end wall thereof. One end of this bimetallic strip is suitably fastened and electrically connected to the terminal 36 by a rivet 50' or the like which passes through the end wall of the housing. The other end of the bimetallic element has a hook formation 52 designed to latch with or releasably interengage with a keeper 53 constituted by the marginal wall of an opening in a connecting strip 54 which extends transversely across the outer face of the end wall of the housing and is electrically connected with the fixed end of the movable contact strip of the power or line switch. The mechanical and electric relationships of this embodiment and that previously described are all substantially identical and the arrangement of the latter is different only in the disposition of the bimetallic element of the thermal switch against the end walls instead of the peripheral wall of the housing and in the particulars mentioned. The operating disk is connected up with the movable contact or operating shaft of the volume control device as before and the sequence and mode of operation is the same as that just above described.

Figure 17:
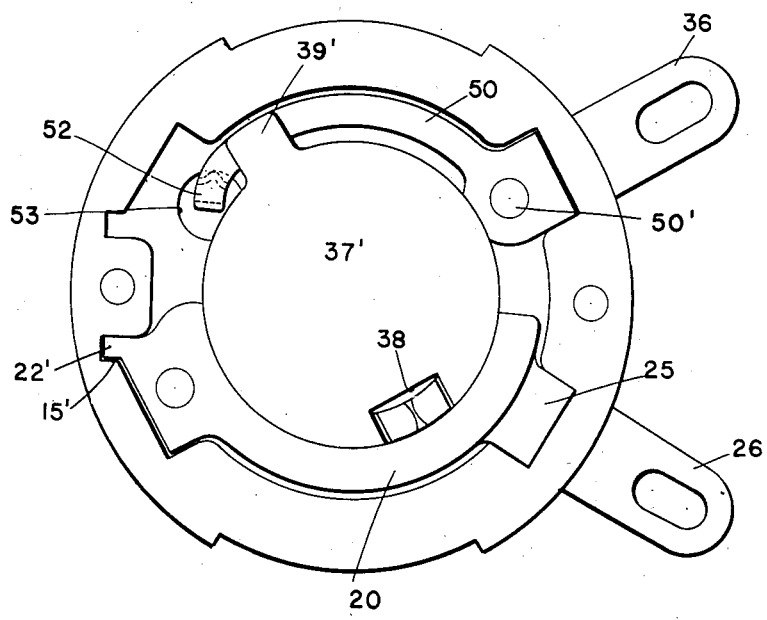
Figure 17 is a view in section taken on line 17—17 of Figure 12.
Figure 18:
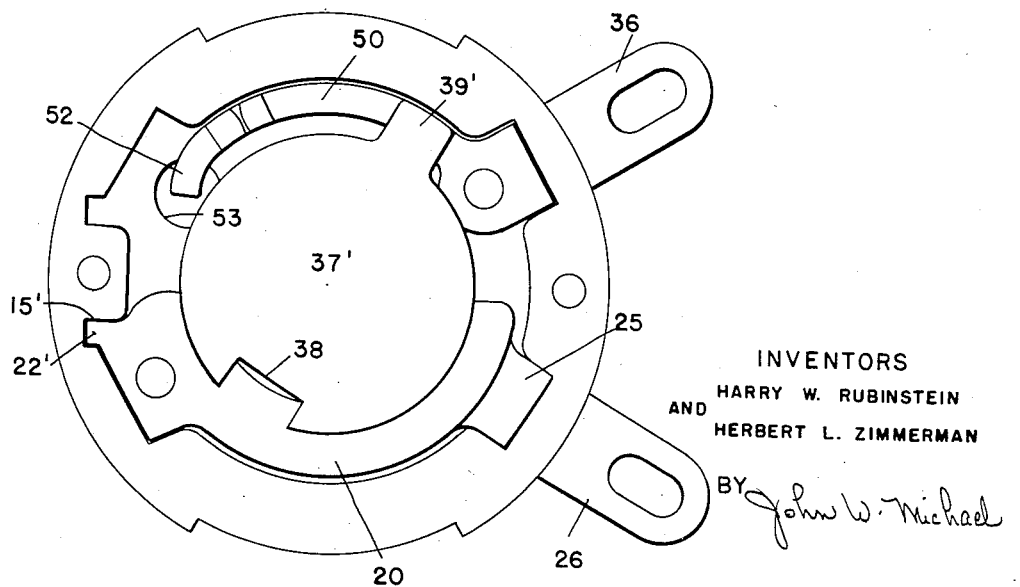
Figure 18 is a view similar to Figure 17 but showing a different position of the parts.

Figure 17 illustrates the disk 37' positioned to reset the thermal switch or overload circuit breaker after the line or power switch has been opened. Figure 18 shows the line switch closed and the overload circuit breaker or thermal switch still latched in closed position. After a surge of current passes through the bimetallic element 50 it will flex out of contact with its keeper and open the circuit. By turning the volume control to its low or off position the power switch will be opened and the projection 39' will press the contact strip 50 against the end wall of the housing and there engage the hook 52 with its keeper, as further illustrated in Figure 13.

In both forms of the invention the snapping of the projection 21 of the movable contact strip 20 into the notch 38 of the disk gives off a slight click and has a distinct feel so as to indicate to the operator when the volume control device is in its low or off position.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A device of the character described comprising an insulating housing, a line switch and a thermal switch supported in the housing and electrically interconnected, and common means for first opening the line switch and then resetting the thermal switch and comprising a rotatable disk mounted in the housing and having a recessed face cooperable with the line switch and also provided with a projection on its periphery cooperable with the thermal switch.

2. A device of the character described comprising a housing of insulating material, a power switch supported in the housing and including a fixed contact secured to the housing and a movable contact made up of a curved strip of spring material also secured to the housing at one end and having its free end engageable with the fixed contact but biased to spring away from the same, a thermal switch supported in the housing and electrically connected to the line switch but also including a fixed contact provided with a keeper and a movable contact made up of a bimetallic strip having one end secured to the housing and having its other end formed with a hook adapted to have latching engagement with the keeper, and operating means for said switches including a disk having a recess, the curved strip of the line switch having a projection engageable with the face of the disk to maintain the switch closed but receivable in said opening to allow the switch to open in one angular position of the disk, said disk also having a peripheral projection so related to the opening as to be effective to reset the thermal switch after the line switch has opened.

3. A device of the character described comprising a housing of insulating material, a power switch supported in the housing and including a fixed contact secured to the housing and a movable contact made up of a curved strip of spring material also secured to the housing at one end and having its free end engageable with the fixed contact but biased to spring away from the same, a thermal switch supported in the housing and electrically connected to the line switch but also including a fixed contact provided with a keeper and a movable contact made up of a bimetallic strip having one end secured to the housing and having its other end formed with a hook adapted to have latching engagement with the keeper, and operating means for said switches including a disk having a recess, the curved strip of the line switch having a projection engageable with the face of the disk to maintain the switch closed but receivable in said opening to allow the switch to open in one angular position of the disk, said disk also having a peripheral projection so related to the opening as to be effective to reset the thermal switch after the line switch has opened, and a connecting strip electrically interconnecting said keeper and the movable contact strip of said power switch.

4. A device of the character described comprising a housing of insulating material, a power switch supported in the housing and including a fixed contact and a movable contact biased to move away from said fixed contact, an operating disk for controlling the position of said switch and having one face engageable with the movable contact and effective to press the same into engagement with the fixed contact, said disk having an opening adapted to be registered with a portion of the movable contact to allow the same to move away from the fixed contact, a rotatable operating element for said disk, and a lost motion driving connection between said element and said disk to cause the switch to open with a faster action.

5. A device of the character described comprising a housing of insulating material, a power switch supported in the housing and including a fixed contact and a movable contact biased to move away from said fixed contact, an operating disk for controlling the position of said switch and having one face engageable with the movable contact and effective to press the same into engagement with the fixed contact, said disk having an opening adapted to be registered with a portion of the movable contact to allow the same to move away from the fixed contact, and a thermal switch electrically interconnected with the power switch and supported in the housing adjacent the periphery of said disk and having a keeper and a thermo-responsive element formed with a hook engageable with the keeper, said thermo-responsive element flexing in a direction to disengage its hook from the keeper under the influence of temperature above a predetermined value, said disk having a projection cooperable with the thermo-responsive element of the thermal switch to reset the same in the angular adjustment of the disk in which its opening registers with said portion of the power switch whereby when the thermal switch is manually reset the power switch is automatically opened.

6. A device of the character described comprising a housing, a thermal switch supported in the housing, and including a fixed contact provided with a keeper, a combined thermo-responsive element and movable contact also supported in the housing and having a hook-like formation on its free end engageable with the keeper of the fixed contact to releasably latch said contacts together, and an operating disk for resetting the thermal switch and having a lateral projection engageable with the curved contact strip of the thermal switch in certain angular adjustments of the disk.

7. A device of the character described comprising a housing of insulating material, a power switch supported in the housing and including a fixed contact secured to the housing, and a movable contact made up of a curved strip of spring material also secured to the housing at one end and having its free end engageable with the fixed contact but biased to spring away from the same, an operating disk for controlling the position of said switch, said movable contact having a projection engaged by one face of said disk whereby the movable contact is pressed against said fixed contact, said disk having an opening receiving said projection in one angular position of the disk to allow the movable contact to spring away from the fixed contact, a rotatable operating element for said disk, and a lost motion driving connection between said element and said disk to cause the switch to open with faster action.

HERBERT L. ZIMMERMAN.
HARRY W. RUBINSTEIN.